(12) United States Patent
Lin et al.

(10) Patent No.: US 11,360,755 B2
(45) Date of Patent: Jun. 14, 2022

(54) METHOD, ELECTRONIC DEVICE, AND COMPUTER PROGRAM PRODUCT FOR INSTALLING APPLICATION

(71) Applicant: EMC IP Holding Company LLC, Hopkinton, MA (US)

(72) Inventors: Zhenzhen Lin, Shanghai (CN); Anzhou Hou, Shanghai (CN); Pengfei Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/884,744

(22) Filed: May 27, 2020

(65) Prior Publication Data

US 2021/0349704 A1    Nov. 11, 2021

(30) Foreign Application Priority Data

May 6, 2020    (CN) .......................... 202010374366.0

(51) Int. Cl.
| | | |
|---|---|---|
| *G06F 9/44* | (2018.01) | |
| *G06F 9/455* | (2018.01) | |
| *G06F 9/445* | (2018.01) | |
| *G06F 8/61* | (2018.01) | |

(52) U.S. Cl.
CPC ...................................... *G06F 8/61* (2013.01)

(58) Field of Classification Search
CPC ...... G06F 8/61; G06F 8/60; G06F 8/65; G06F 16/10; G06F 9/4406
See application file for complete search history.

(56) References Cited

U.S. PATENT DOCUMENTS

| | | | |
|---|---|---|---|
| 9,609,085 B2* | 3/2017 | Liverance | ............... H04L 67/34 |
| 2006/0195490 A1* | 8/2006 | Toebes | ................... G06F 16/10 |
| 2008/0289006 A1* | 11/2008 | Hock | ................... H04L 67/108 |
| | | | 726/4 |

(Continued)

FOREIGN PATENT DOCUMENTS

| | | | |
|---|---|---|---|
| CN | 102664813 A | * | 9/2012 |
| CN | 108958742 A | * | 12/2018 |

OTHER PUBLICATIONS

Bozho, Idea: A generic P2P network client, 2019, pp. 1-9. https://techblog.bozho.net/idea-a-generic-p2p-network-client/ (Year: 2019).*

(Continued)

*Primary Examiner* — Mongbao Nguyen
(74) *Attorney, Agent, or Firm* — Ryan, Mason & Lewis, LLP

(57) ABSTRACT

A method comprises: in response to receiving a file identification of a first file in an application to be installed in a computing device, sending the file identification to a file server, wherein the first file belongs to a first file group of the application, and the first file group is a part of a file set of the application. The method further comprises: in response to receiving a first file group identification of the first file group from the file server, acquiring the first file group based on the first file group identification. The method further comprises: installing the application based on at least the first file group and a second file group of the application, wherein the second file group is another part of the file set of the application.

20 Claims, 7 Drawing Sheets

(56) References Cited

U.S. PATENT DOCUMENTS

| | | | | |
|---|---|---|---|---|
| 2009/0187603 | A1* | 7/2009 | Sakamoto | G06F 16/1873 |
| 2010/0011060 | A1* | 1/2010 | Hilterbrand | H04L 67/108 |
| | | | | 709/204 |
| 2012/0303764 | A1* | 11/2012 | Ibenforth | H04L 67/18 |
| | | | | 709/219 |
| 2014/0201209 | A1* | 7/2014 | Hashimoto | G06F 3/064 |
| | | | | 707/737 |
| 2014/0365624 | A1* | 12/2014 | Whittemore | H04L 67/34 |
| | | | | 709/221 |
| 2015/0019600 | A1* | 1/2015 | Kanehira | G06F 16/183 |
| | | | | 707/827 |
| 2015/0113522 | A1* | 4/2015 | Ross | G06F 8/61 |
| | | | | 717/174 |
| 2015/0363181 | A1* | 12/2015 | Alberti | G06F 8/61 |
| | | | | 717/177 |
| 2017/0206072 | A1* | 7/2017 | Hasegawa | G06F 9/44521 |
| 2018/0181381 | A1* | 6/2018 | Michaely | G06F 3/04842 |
| 2018/0349230 | A1* | 12/2018 | Gupta | G06F 11/1451 |
| 2018/0364999 | A1* | 12/2018 | Li | G06F 9/445 |
| 2018/0373519 | A1* | 12/2018 | Kitabatake | G06F 3/1225 |
| 2019/0065168 | A1* | 2/2019 | Nakamura | G06F 8/65 |
| 2019/0324733 | A1* | 10/2019 | Lubyanskyy | G06F 8/61 |
| 2019/0340362 | A1* | 11/2019 | Wright | G06F 21/10 |
| 2019/0369979 | A1* | 12/2019 | Woods | H04L 67/1095 |
| 2020/0004520 | A1* | 1/2020 | Storm | H04W 12/06 |
| 2020/0183678 | A1* | 6/2020 | Tan | G06F 8/70 |
| 2020/0233907 | A1* | 7/2020 | John | H04L 67/42 |

OTHER PUBLICATIONS

Mark Scanlon, BitTorrent Sync: Network Investigation Methodology, 2014, pp. 21-29. https://ieeexplore.ieee.org/stamp/stamp.jsp?tp=&arnumber=6980260 (Year: 2014).*

Takamichi Saito, OS and Application Identification by Installed Fonts, 2016, pp. 684-689. https://ieeexplore.ieee.org/stamp/stamp.jsp?tp=&arnumber=7474155 (Year: 2016).*

B. Kahanwal et al., "The Distributed Computing Paradigms: P2P, Grid, Cluster, Cloud, and Jungle," International Journal of Latest Research in Science and Technology, vol. 1, No. 2, Jul.-Aug. 2012, pp. 183-187.

J. Cope, "What's a Peer-to Peer (P2P) Network?" https://www.computerworld.com/article/2588287/networking-peer-to-peer-network.html, Apr. 8, 2002, 5 pages.

* cited by examiner

METHOD, ELECTRONIC DEVICE, AND COMPUTER PROGRAM PRODUCT FOR INSTALLING APPLICATION

RELATED APPLICATION(S)

The present application claims priority to Chinese Patent Application No. 202010374366.0, filed May 6, 2020, and entitled "Method, Electronic Device, and Computer Program Product for Installing Application," which is incorporated by reference herein in its entirety.

FIELD

Embodiments of the present disclosure relate to the field of device management, and in particular, to a method, an electronic device, and a computer program product for installing an application.

BACKGROUND

With the development of computer technologies, increasingly more computer devices such as servers are used. When these computer devices are used, various applications such as an operating system need to be installed. The various computing devices are managed and run by installing appropriate operating systems.

As the amount of data to be processed increases, a data center is usually used to manage and process the data. There are a large number of servers in the data center, and these servers are run by installing operating systems on the servers. However, there are still many problems to be solved in the process of running the operating systems on the servers.

SUMMARY

A method, a device, and a computer program product for installing an application are provided in embodiments of the present disclosure.

According to a first aspect of the present disclosure, a method for installing an application is provided. The method comprises: in response to receiving a file identification of a first file in an application to be installed in a computing device, sending the file identification to a file server, wherein the first file belongs to a first file group of the application, and the first file group is a part of a file set of the application. The method also comprises: in response to receiving a first file group identification of the first file group from the file server, acquiring the first file group based on the first file group identification. The method further comprises: installing the application based on at least the first file group and a second file group of the application, wherein the second file group is another part of the file set of the application.

According to a second aspect of the present disclosure, a method for installing an application is provided. The method comprises: in response to receiving a first file identification of a first file from a computing device, determining a first file group of an application to be installed in the computing device, with the first file belonging to the first file group, wherein the first file group is a part of a file set of the application. The method further comprises: sending the first file group identification to the computing device, so that the computing device installs the application based on at least the first file group identification and a second file group of the application, wherein the second file group is another part of the file set of the application.

According to a third aspect of the present disclosure, an electronic device is provided. The electronic device comprises at least one processor; and a memory coupled to the at least one processor and having instructions stored thereon, wherein when executed by the at least one processor, the instructions cause the device to perform actions comprising: in response to receiving a file identification of a first file in an application to be installed in a computing device, sending the file identification to a file server, wherein the first file belongs to a first file group of the application, and the first file group is a part of a file set of the application; in response to receiving a first file group identification of the first file group from the file server, acquiring the first file group based on the first file group identification; and installing the application based on at least the first file group and a second file group of the application, wherein the second file group is another part of the file set of the application.

According to a fourth aspect of the present disclosure, an electronic device is provided. The electronic device comprises at least one processor; and a memory coupled to the at least one processor and having instructions stored thereon, wherein when executed by the at least one processor, the instructions cause the device to perform actions comprising: in response to receiving a first file identification of a first file from a computing device, determining a first file group of an application to be installed in the computing device, with the first file belonging to the first file group, wherein the first file group is a part of a file set of the application; and sending the first file group identification to the computing device, so that the computing device installs the application based on at least the first file group identification and a second file group of the application, wherein the second file group is another part of the file set of the application.

According to a fifth aspect of the present disclosure, a computer program product tangibly stored in a non-volatile computer-readable medium and comprising machine-executable instructions is provided. When executed, the machine-executable instructions cause a machine to perform steps of the method in the first aspect of the present disclosure.

According to a sixth aspect of the present disclosure, a computer program product tangibly stored in a non-volatile computer-readable medium and comprising machine-executable instructions is provided. When executed, the machine-executable instructions cause a machine to perform steps of the method in the second aspect of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings. In the example embodiments of the present disclosure, identical reference numerals generally represent identical members.

In the drawings, identical or corresponding reference numerals indicate identical or corresponding parts.

DETAILED DESCRIPTION

Figure 1:
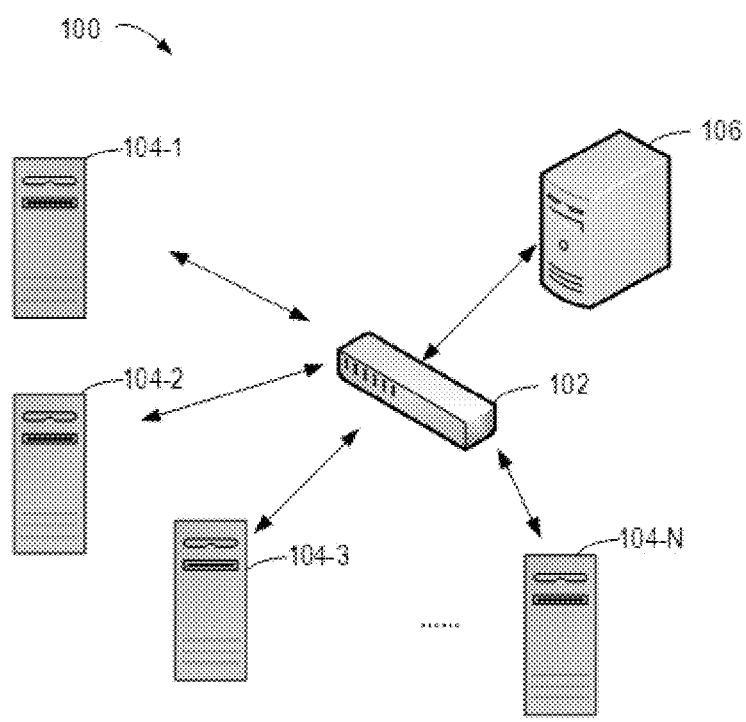
FIG. 1 is a schematic diagram of example environment in which a device and/or a method according to an embodiment of the present disclosure can be implemented.

Embodiments of the present disclosure will be described in more detail below with reference to the accompanying drawings. Although some embodiments of the present disclosure are shown in the accompanying drawings, it should be understood that the present disclosure can be implemented in various forms, and should not be construed as being limited to the embodiments set forth here. Conversely, these embodiments are provided for more thorough and complete understanding of the present disclosure. It should be understood that the accompanying drawings and embodiments of the present disclosure are for exemplary purposes only, and are not intended to limit the protection scope of the present disclosure.

In the description of the embodiments of the present disclosure, the term "include" and its similar terms should be understood as an open-ended inclusion, that is, "include, but not limited to." The term "based on" should be understood as "based at least in part on." The terms "an embodiment" or "the embodiment" should be understood as "at least one embodiment." The terms "first," "second," and the like may refer to different or identical objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and implement the present disclosure, and are not intended to limit the scope of the present disclosure in any way.

There are a large number of, usually hundreds or thousands of, servers in a data center. Hardware management of the large number of servers in the data center is always a time-consuming task. In the data center, a management host generally provides management functions for the servers in the data center. The management host and other servers are connected over a management network, and the network speed is usually low, for example, 1G. The network is dedicated to internal management of the data center. The management host sends control commands over the network and exchanges data with all necessary servers, such as issuing and installing an operating system on the servers.

In this network structure, many problems will arise when the operating system is installed in the large number of servers at the same time. Due to the low network speed of the network between the management host and the servers and the relatively large size of the operating system files, when the operating system installation files are transmitted to hundreds of servers, timeout errors are often caused by huge network delays.

Therefore, a peer-to-peer (P2P) technology is usually adopted to solve the data transmission. After a server downloads a P2P client terminal from a management host, most of the data is transmitted between the servers using the P2P technology, such as BitTorrent or IPFS.

However, if the installation files of the entire operating system are transmitted over the network, a lot of bandwidth will be wasted on useless files. In addition, if the server processes all the necessary files in the operating system as independent transmission units, the overhead of this process will also reduce the advantage of high data rate. For a server in the process of installing an operating system, operating system installation files are downloaded first, and then the operating system is installed. The two steps are not run in parallel, which prolongs the entire installation process and increases the possibility of timeout errors.

In order to solve the above problems and other problems, a method for running an application is proposed in the present disclosure. In this method, when receiving a file identification of a first file in an application to be installed in a computing device, the computing device sends the file identification to a file server, wherein the first file belongs to a first file group of the application, and the first file group is a part of a file set of the application. Then, the computing device receives the first file group identification of the first file group from the file server, and acquires the first file group based on the first file group identification. The computing device installs the application based on at least the first file group and a second file group of the application, wherein the second file group is another part of the file set of the application, and the application is, for example, an operating system. Through the above method, transferring too much data between computing devices is avoided, thus reducing the overhead of data transmission processing, and because the file groups can be processed in parallel, the time for installing the application is reduced.

In the following, FIG. 1 is a schematic diagram of example environment 100 in which a device and/or a method according to an embodiment of the present disclosure can be implemented.

As shown in FIG. 1, an example environment includes file server 106, communication device 102, and computing devices 104-1, 104-2, 104-3, . . . , 104-N, wherein N is a positive integer, and for convenience of description, they are collectively referred to as computing device 104.

Computing device 104 needs to install an application, such as an operating system. When computing device 104 is started, a message indicating that computing device 104 is started will be sent to a configuration server. The configuration server manages configuration of computing device 104, which determines files of the application to be installed in computing device 104.

In some embodiments, the configuration server selects, from all files of the application, a file set formed by a plurality of files that need to be installed in computing device 104, and does not need to select and send all files, thus reducing the data that needs to be transmitted.

Then, the configuration server sends file identifications of the files in the file set and address information of file server 106 where the file set is located to computing device 104. In some embodiments, computing device 104 also acquires from the configuration server a type, such as Thunder or BitTorrent (BT), of a P2P client terminal to be used by computing device 104.

Computing device 104 then sends the file identifications of the files in the file set to file server 106 based on the address information of file server 106. Computing device 104 will then receive file group identifications of a plurality of file groups from file server 106, the plurality of file groups being formed by the files in the file set.

Computing device 104 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Communication device 102 is configured to implement communication between computing device 104 and file server 106. Communication device 102 may be a switch, a server, or any other suitable communication device.

File server 106 receives the identifications of the files in the file set from computing device 104. Then, file server 106 acquires the files in the file set with the file identifications, and forms the file set into a plurality of file groups, for example, places the files in different file groups according to dependencies between the files. The file group identifications of the plurality of file groups are then sent to computing device 104. Computing device 104 then uses the plurality of file group identifications of the plurality of file groups to acquire a plurality of file groups of the application. Computing device 104 may install the file groups after acquiring the file groups. Therefore, a plurality of file groups can be acquired and installed in parallel. After the installation of the plurality of file groups is completed, the installation of the application on computing device 104 is achieved.

In some embodiments, before sending the file identification to the file server, computing device 104 first sends to file server 106 a type of a P2P client terminal to be installed. Then, an installation file of the P2P client terminal is acquired from file server 106. After the P2P client terminal is installed, computing device 104 transmits the file identification of the file of the application to be installed through the P2P client terminal. Then, a seed formed by an identification of a file group is acquired from file server 106, and then the seed is used to download a plurality of files of the application using the P2P technology.

Figure 2:
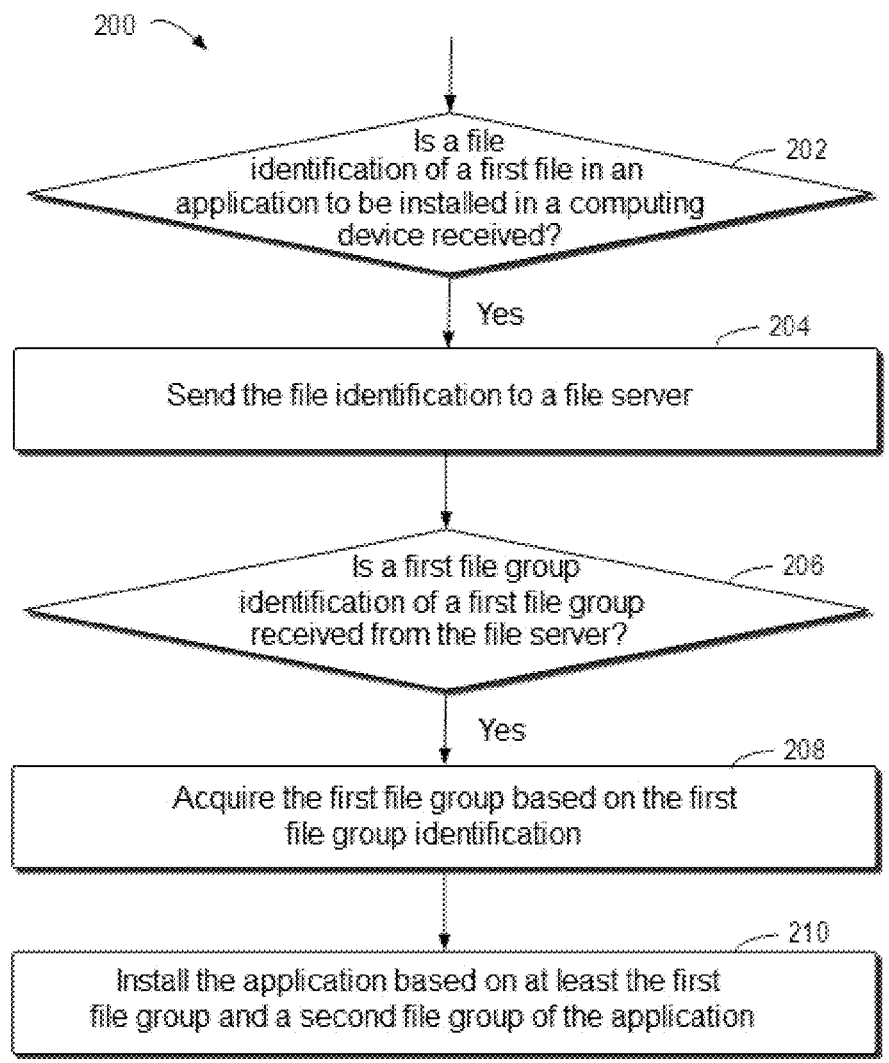
FIG. 2 is a flowchart of method for installing an application according to an embodiment of the present disclosure.

A schematic diagram of environment 100 in which a device and/or a method according to an embodiment of the present disclosure can be implemented is described above with reference to FIG. 1. Method 200 for installing an application according to an embodiment of the present disclosure is described below with reference to FIG. 2, wherein method 200 may be performed at computing device 104 in FIG. 1 or any other suitable device.

In block 202, computing device 104 determines whether a file identification of a first file in an application to be installed in computing device 104 is received. Computing device 104 generally first receives the file identification of the file of the application to be installed in computing device 104.

In some embodiments, when computing device 104 is started, it may send a message to a configuration server indicating that the computing device is started. Computing device 104 will then receive, from the configuration server, the file identification of the first file to be installed in the started computing device. Alternatively, or additionally, computing device 104 may also receive file identifications of other files of the application from the configuration server. An operating system configured by the configuration server for computing device 104 may only select the file required by computing device 104, instead of selecting all operating system files. This can reduce the volume of data transmission.

In some embodiments, computing device 104 may also receive, from the configuration server, an address of file server 106 where the file set of the application is located. Alternatively or additionally, computing device 104 also receives, from the configuration server, a type of a P2P client terminal, such as Thunder, BT, or another P2P client, running on computing device 104.

If it is determined that the file identification of the first file in the application to be installed in the computing device is received, in block 204, computing device 104 sends the file identification to file server 106, wherein the first file belongs to the first file group of the application, and the first file group is a part of a file set of the application.

In some embodiments, computing device 104 may also send to file server 106 file identifications of other files in the file set of the application. In some embodiments, computing device 104 sends to file service 106 the type of the P2P client terminal to be acquired, and then downloads the P2P client terminal from file server 106. Then, computing device 104 sends, through the P2P client terminal, the file identification of the first file of the application to be downloaded and the file identifications of other files in the file set to file server 106.

In block 206, computing device 104 determines whether a first file group identification of the first file group is received from file server 106. In some embodiments, after receiving the file identification of the first file of the application from computing device 104, file server 106 will form the first file group including the first file. Alternatively or additionally, file server 106 may also receive file identifications of other files in the file set of the application from computing device 104, and then classify the first file and other files in the file set into a plurality of groups. In some embodiments, metadata of the file of the application includes other files on which the file depends. The files in the file set are classified into a plurality of file groups based on a dependency relationship of the files. In one example, a file and its dependent files are formed into one file group. Alternatively or additionally, if a dependent file thereof has been included in another file group, files that are not included in the other file group are simply formed into one file group with the file.

Then, file server 106 sends the first file group identification of the first file group to computing device 104. Alternatively or additionally, file server 106 further sends the file group identifications of other file groups formed by the file set to computing device 104.

Upon determining that the first file group identification of the first file group is received from file server 106, in block 208, computing device 104 acquires the first file group based on the first file group identification.

In some embodiments, computing device 104 sends the first file group identification to file server 106. In one example, after file server 106 receives the first file group identification, file server 106 searches, based on the first file group identification, for a device to which the first file group has been sent. In one example, the device is another computing device. Then, file server 106 sends an instruction to the device to instruct the device to send the first file group to the computing device, or sends the device identification to the computing device to instruct computing device 104 to request the first file group from the device. Then, computing device 104 receives the first file group from the determined device. In another example, file server 106 may also transmit the first file group to computing device 104.

In some embodiments, computing device 104 performs a logical operation, such as an XOR operation, on the first file group identification and the device identification of computing device 104. Computing device 104 determines a first candidate device from the devices associated with the computing device based on a result of the logical operation. The result of the logical operation can be used to indicate a distance between the first file group identification and the device identification. A routing table is also included in computing device 104. A specific example of the routing table may be obtained with reference to FIG. 5.

The routing table stores addresses of other computing devices having different distances from the computing device identification of computing device 104. After the first file group is generated, file server 106 will find the computing device with the shortest distance to the file group identification of the first file group. The computing device with the shortest distance may be determined by performing a logical operation on the file group identification of the first file group and the identification of the computing device. The first file group is then stored on the computing device.

With the distance determined from the result of the logical operation of the first file group identification and the device identification of computing device 104, the routing table is searched for other computing devices that are close to the determined distance and are connected to computing device 104. Therefore, the first candidate device can be selected through the routing table. Then, computing device 104 sends the first file group identification to the first candidate device to receive the first file group from the first candidate device having the first file group. Alternatively or additionally, at least one other candidate device can be further determined through the determined distance, and the identification of the first file group is sent to the other candidate device. In this way, the first file group can be found quickly, thus saving the search time.

In some embodiments, computing device 104 determines a second candidate device, and the second candidate device and the first computing device are coupled to the same switch. Computing device 104 sends the first file group identification to the second candidate device to receive the first file group from the first candidate device when the second candidate device stores the first file group. Alternatively or additionally, there is at least one other candidate device coupled to the same switch. Computing device 104 also sends the first file group identification to the at least one other candidate device to search for the first file group. If the first file group is not found in the candidate device under the same switch, the first file group may be searched for with the result of the logical operation on the first file group identification and the device identification of computing device 104. In this way, the first file group can be found quicker, thus saving the search time.

In block 210, computing device 104 installs the application based on at least the first file group and the second file group of the application, wherein the second file group is another part of the file set of the application.

In some embodiments, after determining the first file group identification of the first file group, computing device 104 further determines a second file group identification of the second file group. The second file group identification and the first file group identification indicate different parts of the file set of the application. Computing device 104 uses the second file group identification to acquire the second file group, and the acquisition method is the same as that of the first file group. Alternatively or additionally, computing device 104 may also receive other file groups generated by the file set of the application.

Through the above method, transmitting too much data between computing devices is avoided, thus reducing the overhead of data transmission processing, and because the file groups can be processed in parallel, the time for installing applications is reduced.

Figure 3:
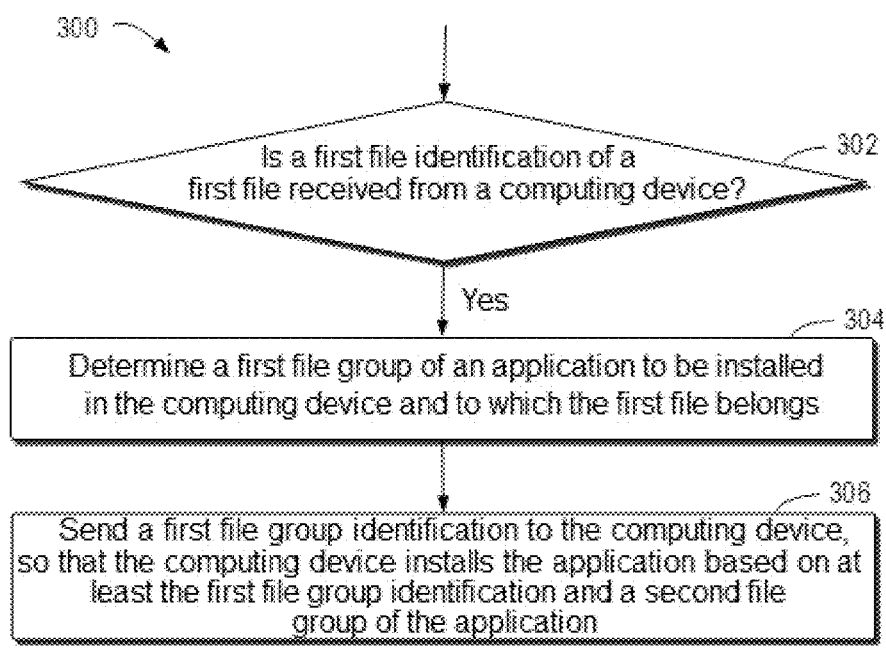
FIG. 3 is a flowchart of method for installing an application according to an embodiment of the present disclosure.

The schematic diagram of method 200 for installing an application according to an embodiment of the present disclosure has been described above with reference to FIG. 2. A process for installing an application executed at file server 106 will be described below with reference to FIG. 3. FIG. 3 is a flowchart of method 300 for installing an application according to an embodiment of the present disclosure. Method 300 in FIG. 3 may be performed by file server 106 in FIG. 1 or any other suitable device.

In 302, file server 106 determines whether a first file identification of a first file is received from computing device 104. After determining that the first file identification of the first file is received from computing device 104, in 304, file server 106 determines a first file group of an application to be installed in computing device 104, with the first file belonging to the first file group, wherein the first file group is a part of a file set of the application.

In some embodiments, file server 106 acquires the first file with the first file identification. File server 106 acquires metadata in the first file, and then determines, from the metadata, a dependent file on which the first file depends. File server 106 determines whether the dependent file is not included in the file group of the application. If the dependent file is not included in the file group of the application, file server 106 generates the first file group from the first file and the dependent file.

In some embodiments, file server 106 may further receive identifications of other files in the file set of the application, obtain the other files using the identifications of the other files, and generate at least one other file group including the other files, for example, a second file group, based on file dependencies.

In 306, file server 106 sends a first file group identification to the computing device, so that the computing device installs the application using the first file group identification and the second file group of the application, wherein the second file group is another part of the file set of the application. Alternatively or additionally, other file groups of the file set are also used to install the application.

In some embodiments, file server 106 receives the first file group identification from the computing device. File server 106 uses the first file group identification to determine a device that stores the first file group. File server 106 instructs the determined device to send the first file group to computing device 104.

With the above method, the file set of the application is transferred by using the file group, the data transmission is accelerated, and because the file groups can be processed in parallel, the total installation time is reduced.

Figure 4:
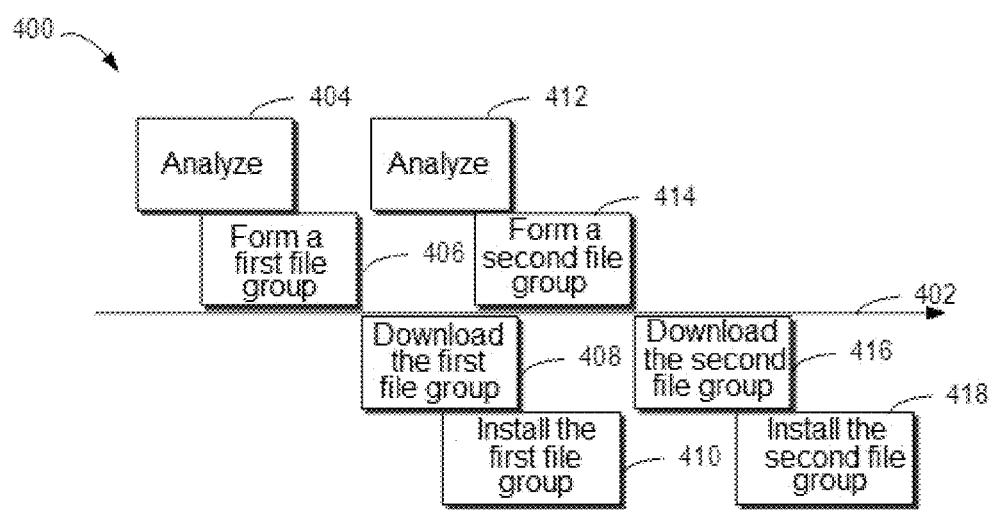
FIG. 4 is a schematic diagram of process of installing an application according to an embodiment of the present disclosure.

The schematic diagram of method 300 for installing an application according to an embodiment of the present disclosure has been described above with reference to FIG. 3. An example installation process of an application will be described below with reference to FIG. 4. FIG. 4 is a schematic diagram of process 400 of installing an application according to an embodiment of the present disclosure.

As shown in FIG. 4, time axis 402 represents the time when the application was installed. Operations performed by file server 106 are above time axis 402. Operations performed by computing device 104 are below time axis 402.

After receiving a first file identification in a file set from computing device 104, file server 106 performs analysis operation 404 on a first file. Alternatively or additionally, the file server may further receive file identifications of other files in the file set, and then perform analysis operations on the other files. File server 106 then performs operation 406 of forming a first file group. For example, the first file group includes the first file and files that have a dependency relationship with the first file. Then, computing device 104 performs operation 408 of downloading the first file group. After downloading the first file group, computing device 104 performs operation 410 of installing the first file group.

Similar to the installation of the first file group, file server 106 may continue to perform analysis operation 412 to analyze other files in the file set after performing operation 406 of forming the first file group. Then, operation 414 of forming a second file group is performed based on the dependency relationship between the files. At computing device 104, operation 416 of downloading the second file group is performed, and then operation 418 of installing the second file group is performed. Then, the application installation process is completed.

By classifying a plurality of files in the file set of the application into a plurality of groups, the generation, downloading, and installation of the file group can be performed in parallel, which improves the installation process of the application and reduces the time delay.

Figure 5:
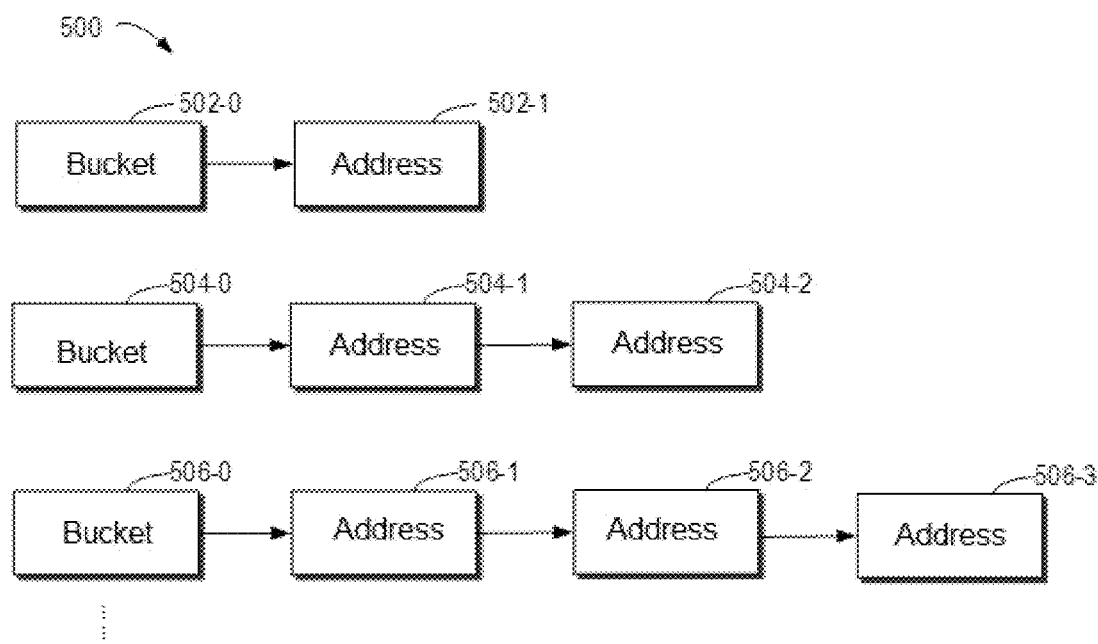
FIG. 5 is a schematic diagram of routing table according to an embodiment of the present disclosure.

The schematic diagram of process 400 of installing an application according to an embodiment of the present disclosure has been described above with reference to FIG. 4. An example of a routing table utilized by computing device 104 will be described below with reference to FIG. 5. FIG. 5 is a schematic diagram of routing table 500 according to an embodiment of the present disclosure.

In FIG. 5, routing table 500, such as a distributed hash table, is generated in computing device 104. Computing device 104 uses hash table 500 to search for a first file group or another file group of an application.

In this example, each file group and computing device 104 has a unique identification generated by the same hash function. For example, an identification of computing device 104 is generated by computing device 104, and an identification of the file group is generated by a device that generates files, such as file server 106. Therefore, the identification of the file group and the identification of computing device 104 are in the same space.

Routing table 500 includes a plurality of buckets, such as bucket 502-0, bucket 504-0, and bucket 506-0. Neighbor computing devices at the same distance from computing device 104 are connected behind each bucket. In one example, the routing table is a Kademlia distributed routing table.

The neighbor computing devices at the same distance in bucket 502-0, bucket 504-0, and bucket 506-0 are determined by performing a logical operation on the identification of computing device 104 and the identifications of the neighbor computing devices. For example, address 502-1 of the neighbor computing device whose XOR result is $2^0$ is placed behind bucket 502-0; address 504-1 and address 504-2 of the neighbor computing devices whose XOR result is $2^1$ are placed in behind bucket 504-0, address 506-1, address 506-2, and address 506-3 of the other three neighbor computing devices whose XOR result is $2^2$ are placed behind bucket 506-0. Similarly, neighbor devices at different distances are placed behind different buckets.

In this way, a routing table of distances between computing device 104 and neighbor computing devices can be formed. When file server 106 sends the file group to other computing devices, the file group is also stored on a computing device with the smallest result of a logical operation performed on the identification of the file group and the identification of the computing device 104. In this way, a data packet is stored on a computing device having the shortest distance thereto. Therefore, computing device 104 may determine a distance between computing device 104 and a file group based on a result of a logical operation performed on the identification of computing device 104 and the identification of the file group. Computing device 104 then looks up in the routing table to see whether computing device 104 within several buckets close to the distance has stored the file group. In this way, the acquisition of the file groups is accelerated.

Figure 6:
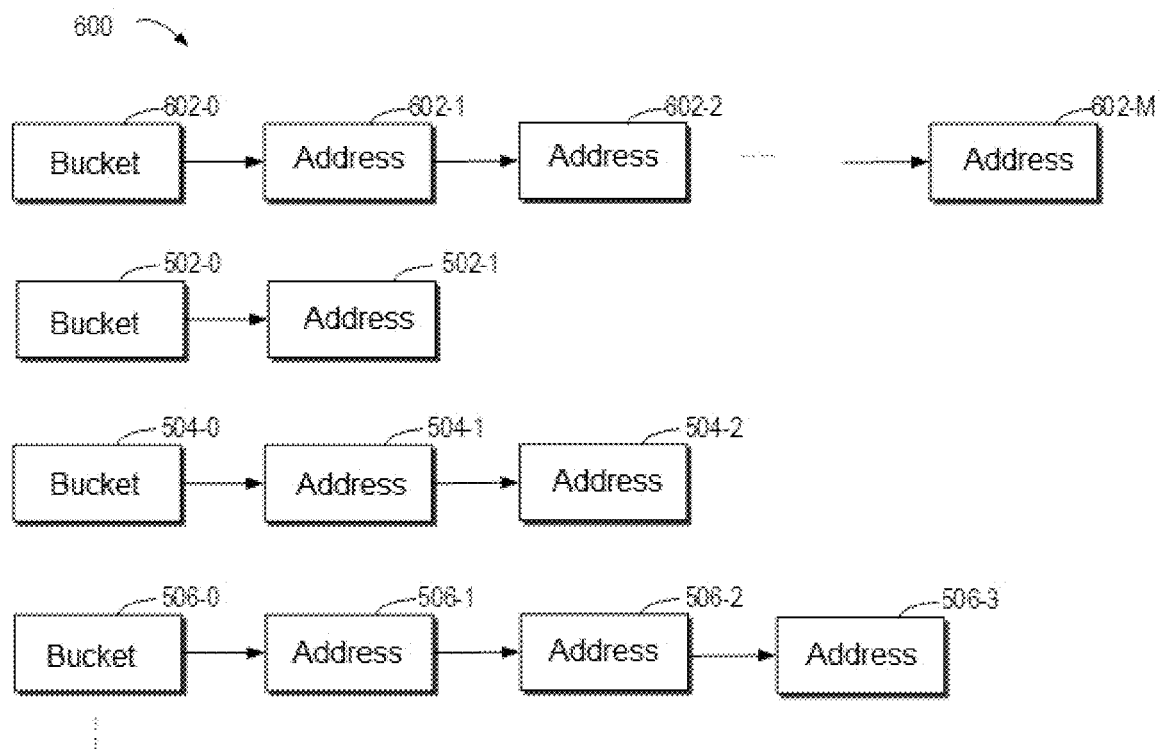
FIG. 6 is a schematic diagram of routing table according to an embodiment of the present disclosure.

The schematic diagram of routing table 500 according to an embodiment of the present disclosure has been described above with reference to FIG. 5. Another example of a routing table utilized by computing device 104 will be described below with reference to FIG. 6. FIG. 6 is a schematic diagram of routing table 600 according to an embodiment of the present disclosure.

In the method shown in FIG. 6, addresses of bucket 1, bucket 2, and bucket 3 and the following are the same as those in FIG. 5, which therefore will not be described in detail. In this example, bucket 602-0 is further set in routing table 600, which is followed by addresses 602-1, 602-2, ..., 602-M of a plurality of computing devices under the same switch as computing device 104, where M is a positive integer. Before searching bucket 502-0, bucket 504-0, bucket 506-0, etc., bucket 602-0 of the computing device under the same switch is searched first. In one example, an ID of the computing device may be set to be formed from an identification of the switch and an identification of the computing device. Therefore, by performing an exclusive OR operation between computing devices, it can be determined that a result of the exclusive OR operation of IDs under the same switch is the smallest. In this way, bucket 602-0 can be easily generated. If the computing device on the same switch includes a file group, the file package can be acquired from the computing device, which improves the efficiency of obtaining a file package.

The routing table in this format can speed up the process of acquiring files, thus saving time and improving the efficiency.

Advantageously, in accordance with illustrative embodiments, transferring too much data between computing devices can be avoided, the overhead of data transmission processing can be reduced, and the time of installing the application is reduced as file groups can be processed in parallel.

Figure 7:
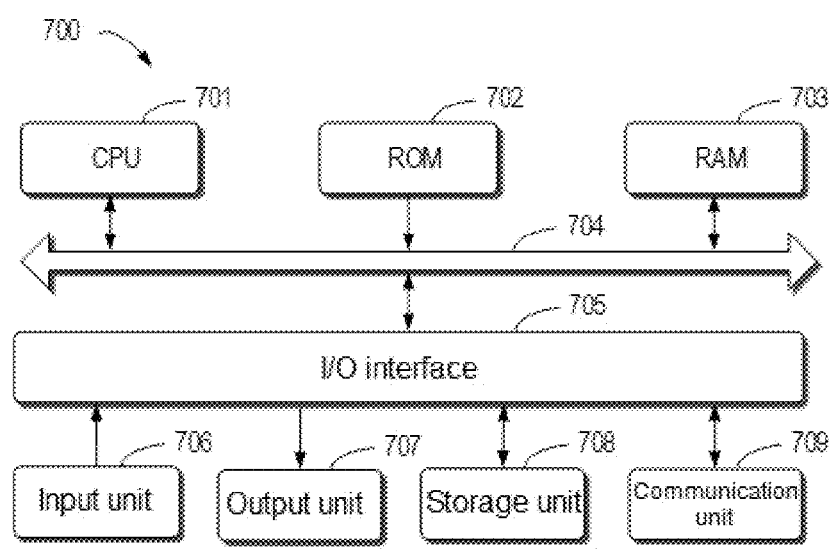
FIG. 7 is a schematic block diagram of example device 700 suitable for implementing an embodiment of the present disclosure.

FIG. 7 is a schematic block diagram of example device 700 that can be configured to implement an embodiment of content of the present disclosure. For example, computing device 104 and file server 106 as shown in FIG. 1 may be implemented by device 700. As shown in the drawing, device 700 includes central processing unit (CPU) 701 that can perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, for example, methods 200 and 300, are performed by processing unit 701. For example, in some embodiments, methods 200 and 300 may be implemented as a computer software program that is tangibly included in a machine-readable medium such as storage unit 708. In some embodiments, some or all of the computer program may be loaded and/or installed onto device 700 through ROM 702 and/or communication unit 709. When the computer program is loaded into RAM 703 and executed by CPU 701, one or more steps of methods 200 and 300 described above can be implemented.

The present disclosure may be a method, an apparatus, a system, and/or a computer program product. The computer program product may include a computer-readable storage medium containing thereon computer readable program instructions for performing various aspects of the present disclosure.

The computer-readable storage medium may be a tangible storage device that can maintain and store instructions used by an instruction execution device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagating freely, electromagnetic waves propagating through waveguides or other transmission media (e.g., light pulses propagating through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions may be executed completely on a user's computer, partially on a user's computer, as a separate software package, partially on a user's computer and partially on a remote computer, or completely on a remote computer or server. In the case where a remote computer is involved, the remote computer can be connected to a user computer over any kind of networks, including a local area network (LAN) or wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of the computer-readable program instructions. The electronic circuit can execute the computer-readable program instructions to implement various aspects of the present disclosure.

Various aspects of the present disclosure are described here with reference to flowcharts and/or block diagrams of the method, the apparatus/system, and the computer program product according to embodiments of the present disclosure. It should be appreciated that each block in the flowcharts and/or block diagrams and a combination of blocks in the flowcharts and/or block diagrams can be implemented by computer-readable program instructions.

The computer-readable program instructions can be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause a computer, another programmable data processing apparatus, and/or another device to work in a specific manner, such that the computer-readable medium storing the instructions includes an article of manufacture including instructions for implementing various aspects of functions/actions specified by one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible embodiments of systems, methods, and computer program products according to multiple embodiments of the present disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that as labeled in the accompanying drawings. For example, two successive blocks may actually be performed basically in parallel, or they can be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above. The foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements of technologies on the market, and/or to enable other persons of ordinary skill in the art to understand the embodiments disclosed here.

What is claimed is:

1. A computer-implemented method for installing an application, comprising:
   in response to starting of a computer device, sending a message to a configuration server indicating that the computing device is started;
   receiving, from the configuration server, a file identification of a first file in an application to be installed in the started computing device;
   in response to receiving the file identification of the first file, sending the file identification to a file server, wherein the first file belongs to a first file group of the application, and the first file group is a part of a file set of the application;
   in response to receiving a first file group identification of the first file group from the file server, acquiring the first file group based on the first file group identification, wherein acquiring the first file group comprises:
   sending the first file group identification to the file server, so that the file server determines, based on the first file group identification, at least one given candidate device that stores the first file group; and
   receiving the first file group from the at least one given candidate device; and
   installing the application based on at least the first file group and a second file group of the application, wherein the second file group is another part of the file set of the application and is determined based on the first file group identification;
   wherein acquiring the first file group further comprises:
      determining the at least one given candidate device associated with the computing device; and
      sending the first file group identification to the at least one given candidate device to receive the first file group from the at least one given candidate device when the at least one given candidate device stores the first file group; and
   wherein determining the at least one given candidate device comprises at least one of the following:
      determining, based on a result of a logical operation performed on the first file group identification and the computing device, the at least one given candidate device; and
      determining the at least one given candidate device and the computing device are coupled to the same switch.

2. The computer-implemented method of claim 1, wherein acquiring the first file group comprises:
   performing the logical operation on the first file group identification and a device identification of the computing device;
   determining, based on the result of the logical operation, a first candidate device from devices associated with the computing device; and
   sending the first file group identification to the first candidate device to receive the first file group from the first candidate device when the first candidate device contains the first file group.

3. The computer-implemented method of claim 1, wherein acquiring the first file group comprises:
   determining a second candidate device, wherein the second candidate device and the computing device are coupled to the same switch; and
   sending the first file group identification to the second candidate device to receive the first file group from the second candidate device when the second candidate device stores the first file group.

4. The computer-implemented method of claim 1, further comprising acquiring the second file group by performing at least the following:
   determining a second file group identification of the second file group based on the first file group identification, wherein the second file group identification and the first file group identification indicate different parts of the file set of the application; and
   acquiring the second file group based on the second file group identification.

5. The computer-implemented method of claim 1, wherein sending the message includes receiving the message from the computing device.

6. The computer-implemented method of claim 1, wherein the application is an operating system and the first file group and the second file group are installed at least partially in parallel.

7. An electronic device, comprising:
   at least one processor; and
   a memory coupled to the at least one processor and having instructions stored thereon, wherein when executed by the at least one processor, the instructions cause the device to perform actions comprising:
   in response to starting of a computer device, sending a message to a configuration server indicating that the computing device is started;
   receiving, from the configuration server, a file identification of a first file in an application to be installed in the started computing device;
   in response to receiving the file identification of the first file, sending the file identification to a file server, wherein the first file belongs to a first file group of the application, and the first file group is a part of a file set of the application;
   in response to receiving a first file group identification of the first file group from the file server, acquiring the first file group based on the first file group identification, wherein acquiring the first file group comprises:
      sending the first file group identification to the file server, so that the file server determines, based on the first file group identification, at least one given candidate device that stores the first file group; and receiving the first file group from the at least one given candidate device; and installing the application based on at least the first file group and a second file group of the application, wherein the second file group is another part of the file set of the application and is determined based on the first file group identification;

wherein acquiring the first file group further comprises:
determining the at least one given candidate device associated with the computing device; and
sending the first file group identification to the at least one given candidate device to receive the first file group from the at least one given candidate device when the at least one given candidate device stores the first file group; and wherein determining the at least one given candidate device comprises at least one of the following:
determining, based on a result of a logical operation performed on the first file group identification and the computing device, the at least one given candidate device; and
determining the at least one given candidate device and the computing device are coupled to the same switch.

8. The electronic device of claim 7, wherein acquiring the first file group comprises:
performing the logical operation on the first file group identification and a device identification of the computing device;
determining, based on the result of the logical operation, a first candidate device from devices associated with the computing device; and
sending the first file group identification to the first candidate device to receive the first file group from the first candidate device when the first candidate device contains the first file group.

9. The electronic device according to claim 7, wherein acquiring the first file group comprises:
determining a second candidate device, wherein the second candidate device and the first computing device are coupled to the same switch; and
sending the first file group identification to the second candidate device to receive the first file group from the second candidate device when the second candidate device stores the first file group.

10. The electronic device of claim 7, further comprising acquiring the second file group by performing at least the following:
determining a second file group identification of the second file group based on the first file group identification, wherein the second file group identification and the first file group identification indicate different parts of the file set of the application; and
acquiring the second file group based on the second file group identification.

11. The electronic device of claim 7, wherein the application is an operating system and the first file group and the second file group are installed at least partially in parallel.

12. The electronic device of claim 7, wherein sending the message includes receiving the message from the computing device.

13. A computer-implemented method for installing an application, comprising:
in response to receiving a first file identification of a first file from a computing device, determining a first file group of an operating system to be installed in the computing device, with the first file belonging to the first file group, wherein the first file group is a part of a file set of the operating system;
determining a first file group identification of the first file group;
determining, based on the first file group identification, a given device that stores the first file group; and
causing the given device to send the first file group to the computing device, so that the computing device installs the operating system based on at least the first file group and a second file group at least partially in parallel, wherein the second file group is another part of the file set of the operating system and is determined based on the first file group identification.

14. The computer-implemented method of claim 13, further comprising:
acquiring the first file based on the file identification;
determining, based on metadata in the first file, a dependent file on which the first file depends; and
in response to that the dependent file is not included in the file group of the operating system, generating the first file group based on at least the first file and the dependent file.

15. The computer-implemented method of claim 13, wherein determining the given device comprises
enabling performing of a logical operation on the first file group identification and the computing device; and
determining, based on a result of the logical operation, the given device from devices associated with the computing device.

16. The computer-implemented method of claim 13, wherein determining the given device comprises:
determining the given device and the computing device are coupled to the same switch.

17. A computer program product tangibly stored on a non-volatile computer-readable medium and comprising machine-executable instructions, wherein when executed on a processor of a computer, the machine-executable instructions cause the computer to perform steps of:
in response to receiving a first file identification of a first file from a computing device, determining a first file group of an operating system to be installed in the computing device, with the first file belonging to the first file group, wherein the first file group is a part of a file set of the operating system;
determining a first file group identification of the first file group;
determining, based on the first file group identification, a given device that stores the first file group; and
causing the given device to send the first file group to the computing device, so that the computing device installs the operating system based on at least the first file group and a second file group at least partially in parallel, wherein the second file group is another part of the file set of the operating system and is determined based on the first file group identification.

18. The computer program product of claim 17, further comprising:
acquiring the first file based on the file identification;
determining, based on metadata in the first file, a dependent file on which the first file depends; and
in response to that the dependent file is not included in the file group of the application, generating the first file group based on at least the first file and the dependent file.

19. An electronic device, comprising at least one processor and a memory coupled to the at least one processor and having instructions stored thereon, wherein when executed by the at least one processor, the instructions cause the device to perform steps of:
- in response to receiving a first file identification of a first file from a computing device, determining a first file group of an operating system to be installed in the computing device, with the first file belonging to the first file group, wherein the first file group is a part of a file set of the operating system;
- determining a first file group identification of the first file group;
- determining, based on the first file group identification, a given device that stores the first file group; and
- causing the given device to send the first file group to the computing device, so that the computing device installs the operating system based on at least the first file group and a second file group at least partially in parallel, wherein the second file group is another part of the file set of the operating system and is determined based on the first file group identification.

20. The electronic device of claim 19, further comprising:
acquiring the first file based on the file identification;
determining, based on metadata in the first file, a dependent file on which the first file depends; and
in response to that the dependent file is not included in the file group of the application, generating the first file group based on at least the first file and the dependent file.

* * * * *